United States Patent
Tang et al.

(10) Patent No.: US 11,307,342 B2
(45) Date of Patent: Apr. 19, 2022

(54) OPTICAL COLLIMATION ASSEMBLY, BACKLIGHT MODULE AND DISPLAY DEVICE

(71) Applicants: Hefei BOE Optoelectronics Technology Co., Ltd., Anhui (CN); BOE Technology Group Co., Ltd., Beijing (CN)

(72) Inventors: Hai Tang, Beijing (CN); Liang Gao, Beijing (CN); Yong Hu, Beijing (CN); Jianwei Qin, Beijing (CN)

(73) Assignees: Hefei BOE Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 15 days.

(21) Appl. No.: 16/966,798

(22) PCT Filed: Feb. 17, 2020

(86) PCT No.: PCT/CN2020/075459
§ 371 (c)(1),
(2) Date: Jul. 31, 2020

(87) PCT Pub. No.: WO2020/192300
PCT Pub. Date: Oct. 1, 2020

(65) Prior Publication Data
US 2021/0231856 A1    Jul. 29, 2021

(30) Foreign Application Priority Data
Mar. 26, 2019 (CN) .......................... 201910233494.0

(51) Int. Cl.
*G02B 6/00* (2006.01)
*F21V 8/00* (2006.01)
*G02B 27/30* (2006.01)

(52) U.S. Cl.
CPC ........... *G02B 6/002* (2013.01); *G02B 6/0068* (2013.01); *G02B 27/30* (2013.01)

(58) Field of Classification Search
CPC ....... G02B 6/002; G02B 6/0068; G02B 27/30
See application file for complete search history.

(56) References Cited

U.S. PATENT DOCUMENTS 7,220,026 B2 * 5/2007 Ko .......................... G02B 5/045
                                                      362/339
7,880,971 B2 * 2/2011 Li ......................... G02B 3/0056
                                                      359/641

(Continued)

FOREIGN PATENT DOCUMENTS

CN        105842774 A      8/2016
CN        106597599 A      4/2017

(Continued)

OTHER PUBLICATIONS

Mar. 16, 2020—(CN) First Office Action Appl 201910233494.0 with English Translation.

*Primary Examiner* — Gerald J Sufleta, II
(74) *Attorney, Agent, or Firm* — Banner & Witcoff, Ltd.

(57) ABSTRACT

An optical collimation assembly, a backlight module and a display device are disclosed. The optical collimation assembly includes: a collimation film including a light incident surface and a light exiting surface; and a light modulation component, located on the light incident surface of the collimation film and includes a plurality of light modulation portions arranged in an array. Each of the plurality of light modulation portions includes: a first surface; a second surface; and a third surface intersecting both the first surface and the second surface, an included angle between the third surface and the first surface is an acute angle, wherein the third surface is configured to reflect light entering the light modulation portion from the second surface, such that the (Continued)

light being reflected exits from the collimation film along a direction substantially perpendicular to the light exiting surface.

20 Claims, 6 Drawing Sheets

(56) References Cited

U.S. PATENT DOCUMENTS

| | | | |
|---|---|---|---|
| 10,761,259 B2* | 9/2020 | Tang | G02B 6/0036 |
| 10,788,614 B2 | 9/2020 | Du et al. | |
| 2003/0082326 A1* | 5/2003 | Yang | B32B 17/10862 |
| | | | 428/40.1 |
| 2008/0239755 A1* | 10/2008 | Parker | G02B 6/0068 |
| | | | 362/619 |
| 2009/0061150 A1* | 3/2009 | Noguchi | G02B 1/118 |
| | | | 428/119 |
| 2013/0294108 A1 | 11/2013 | Hu et al. | |
| 2014/0104871 A1* | 4/2014 | Boyd | G02B 5/045 |
| | | | 362/606 |
| 2014/0340930 A1* | 11/2014 | Nakagome | G02B 6/0025 |
| | | | 362/607 |
| 2014/0375929 A1* | 12/2014 | Boyd | G02B 6/0053 |
| | | | 349/65 |
| 2019/0235150 A1* | 8/2019 | Hsu | G02B 6/0061 |
| 2020/0073047 A1* | 3/2020 | Jeong | G02B 6/009 |
| 2020/0278582 A1* | 9/2020 | Shimizu | G02F 1/133603 |
| 2021/0271845 A1* | 9/2021 | Riehl | G06K 9/0004 |

FOREIGN PATENT DOCUMENTS

| | | |
|---|---|---|
| CN | 108519637 A | 9/2018 |
| CN | 108594354 A | 9/2018 |
| CN | 109212660 A | 1/2019 |
| CN | 109765725 A | 5/2019 |
| DE | 102014200369 A1 | 7/2015 |
| JP | 2011146255 A | 7/2011 |

* cited by examiner

OPTICAL COLLIMATION ASSEMBLY, BACKLIGHT MODULE AND DISPLAY DEVICE

CROSS-REFERENCE TO RELATED APPLICATION

This application is a U.S. National Phase Entry of International Application No. PCT/CN2020/075459 filed on Feb. 17, 2020, designating the United States of America and claiming priority to Chinese Patent Application No. 201910233494.0 filed on Mar. 26, 2019. The present application claims priority to and the benefit of the above-identified applications and the above-identified applications are incorporated by reference herein in their entirety.

TECHNICAL FIELD

Embodiments of the present disclosure relate to an optical collimation assembly, a backlight module, and a display device.

BACKGROUND

Application scenarios such as peep-proof scenario come into being with the rapid development of display technologies. Under the peep-proof scenario, a peep-proof display mode only allows a user located ahead of a display screen to see the content on the display screen, but people located at both lateral sides of the display screen fails to see the content on the display screen, such that observers are provided with sufficiently private viewing experiences.

The core of peep-proof technology lies in light collimation, that is, backlights from a backlight source of a display panel exit in accordance with a specific direction so as to be capable of entering eyes of the user located ahead of the display screen.

SUMMARY

Embodiments of the present disclosure provide an optical collimation assembly, a backlight module, and a display device.

According to the first aspect of the present disclosure, an embodiment of the present disclosure provides an optical collimation assembly, including:

a collimation film, the collimation film including a light incident surface and a light exiting surface; and a light modulation component, the light modulation component being located on the light incident surface of the collimation film and includes a plurality of light modulation portions arranged in an array, each of the plurality of light modulation portions including:

a first surface close to the light incident surface;

a second surface opposite to the first surface and away from the light incident surface; and a third surface intersecting both the first surface and the second surface, an included angle between the third surface and the first surface being an acute angle, wherein the third surface is configured to reflect light entering the light modulation portion from the second surface, such that the light being reflected to exit from the collimation film along a direction substantially perpendicular to the light exiting surface.

According to the second aspect of the present disclosure, an embodiment of the present disclosure provides a backlight module, including:

a light guide assembly, the light guide assembly including a light guide plate, the light guide plate including a light exiting side and a rear side opposite to the light exiting side; and the above-described optical collimation assembly, the optical collimation assembly being stacked with the light guide plate and located at the light exiting side of the light guide plate, and the light modulation component is located between the collimation film and the light guide plate.

According to the third aspect of the present disclosure, an embodiment of the present disclosure provides a display device including the above-described backlight module.

BRIEF DESCRIPTION OF THE DRAWINGS

In order to more clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

FIG. 12($b$) is a side view of a light modulation portion in an embodiment of the present disclosure; and FIG. 12($c$) is another side view of a light modulation portion in an embodiment of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not intended to define a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

Figure 1:
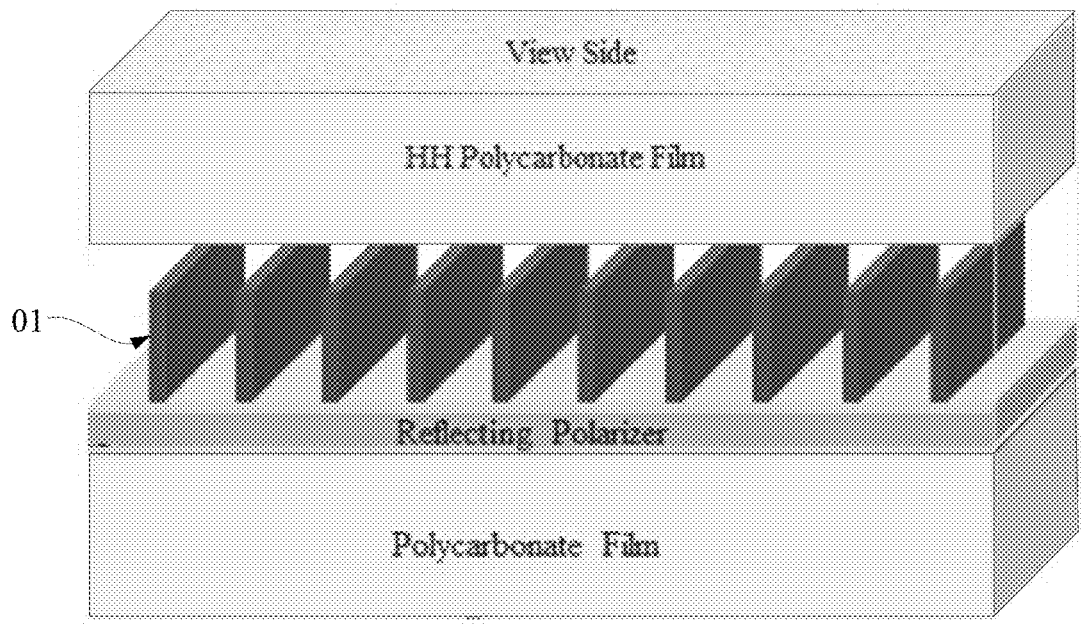
FIG. 1 is a structural diagram of a collimation film of the present disclosure.

In the backlight module of the present disclosure, the collimation film is a film which allows light emitted from the backlight source to exit in accordance with a specific direction. FIG. 1 is a structural diagram of a collimation film in the present disclosure. As illustrated in FIG. 1, the collimation film has a louvered grating structure 01; during working, the louvered grating structure 01 absorbs stray light at a large angle ("large angle" refers to an angle deviating from a Z-direction (i.e., a vertical direction) larger than 30°), and the light parallel to the Z-direction or approximately parallel to the Z-direction can pass through the louvered grating structure 01 so as to achieve the collimation of the light emitted from the backlight source. Because the louvered grating structure 01 of the collimation film absorbs the large-angle light emitted from the backlight source, the brightness of the light passing through the collimation film will be significantly reduced, thereby affecting the display effect of the display device.

The embodiments of the present disclosure provide an optical collimation assembly, a backlight module, and a display device. One of objectives of the embodiments of the present disclosure is to reduce the loss of light brightness when the light exits from the optical device.

An embodiment of the present disclosure provides an optical collimation assembly. The optical collimation assembly includes: a collimation film, the collimation film includes a light incident surface and a light exiting surface; and a light modulation component, the light modulation component is located on the light incident surface of the collimation film and includes a plurality of light modulation portions arranged in an array. Each of the plurality of light modulation portions includes: a first surface close to the light incident surface; a second surface opposite to the first surface and away from the light incident surface; and a third surface intersecting both the first surface and the second surface, an included angle between the third surface and the first surface is an acute angle. The third surface is configured to reflect light entering the light modulation portion from the second surface and to allow the light being reflected to exit from the collimation film along a direction substantially perpendicular to the light exiting surface.

In the optical collimation assembly provided by the embodiment of the present disclosure, the light entering the light modulation portion is reflected by the third surface of the light modulation portion so as to perform a two-dimensional convergence on the incident light, which achieves a collimation effect. Furthermore, because the light exits in accordance with a specific direction, the peep-proof effect can be achieved. When the optical collimation assembly is applied in a backlight module, because the optical collimation assembly of the present embodiment can reflect incident lights including large-angle lights, it would not cause any loss to the brightness of the light emitted from the light source and hence improves the display effect of the display device.

Figure 3:
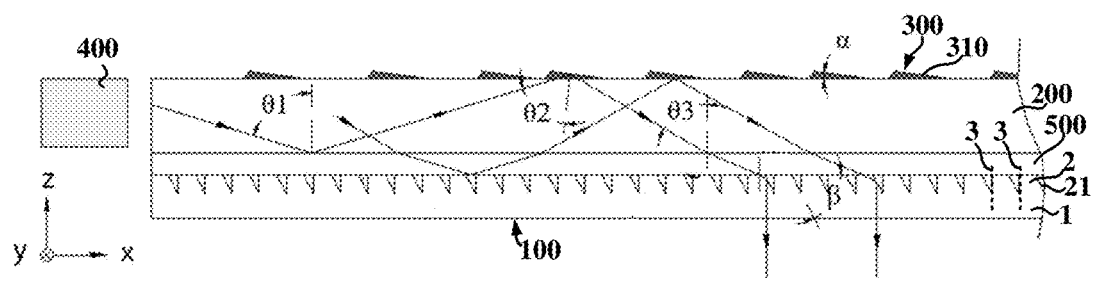
FIG. 3 is a schematic diagram (X direction) of working principle of a backlight module in an embodiment of the present disclosure.
Figure 6:
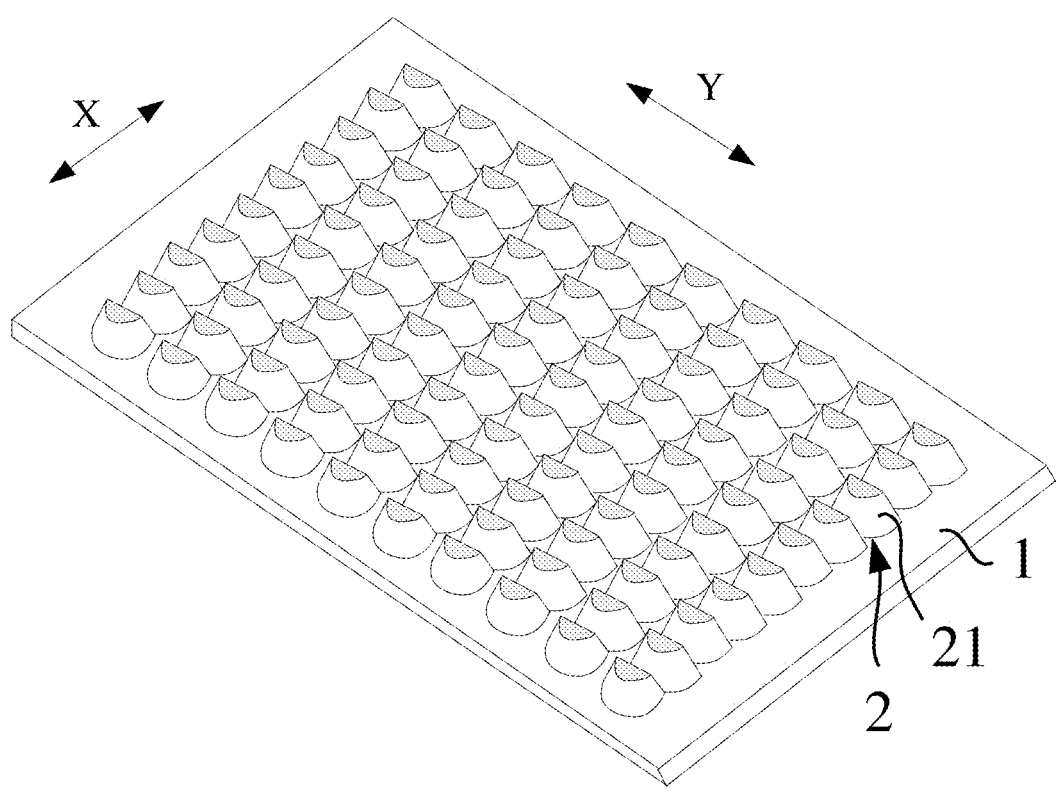
FIG. 6 is a perspective view of an optical collimation assembly in an embodiment of the present disclosure.
Figure 7:
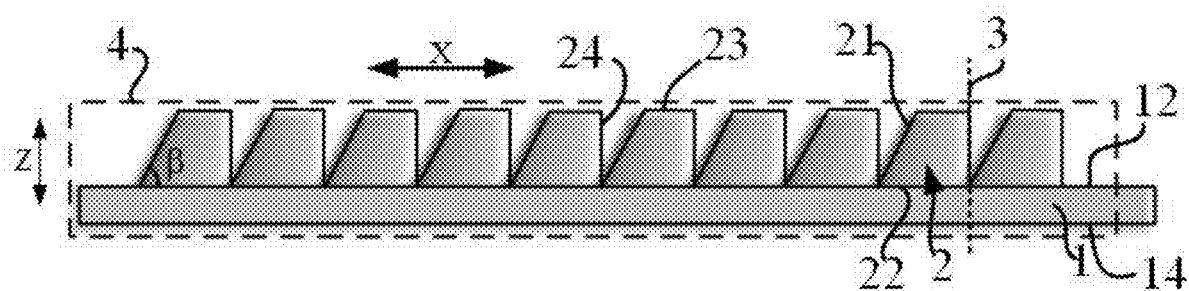
FIG. 7 is a side view of an optical collimation assembly in an embodiment of the present disclosure.

The embodiment of the present disclosure provides an optical collimation assembly. As illustrated in FIG. 6 and FIG. 7, the optical collimation assembly includes a collimation film 1, the collimation film 1 has a light incident surface 12 and a light exiting surface 14, the light incident surface 12 is provided with a light modulation component, the light modulation component includes a plurality of light modulation portions 2 arranged in an array. For example, each of the plurality of light modulation portions 2 has a bottom surface (i.e., the first surface) 22 parallel to the light incident surface 12. Further, in at least one example, the bottom surface is coplanar with the light incident surface 12. The light modulation portion 2 further includes: a top surface (i.e., the second surface) 23 opposite to the bottom surface 22; a third surface 21 and a fourth surface 24 each intersecting both the bottom surface 22 and the top surface 23. As illustrated in FIG. 7, an included angle between the third surface 21 and the bottom surface 22 is an acute angle. As illustrated in FIG. 3, the third surface 21 is configured to reflect light entering the light modulation portion 2 from the top surface 23 and to allow the light being reflected to exit from the collimation film 1 along a direction substantially perpendicular to the light exiting surface 14.

For example, as illustrated in FIG. 6, the third surface 21 is a conical surface, in this way, each of the light modulation portions 2 has a bottom-up tapered shape. Because the third surface 21 is inclined relative to the bottom surface, in the situation where the light entering the light modulation portion 2 is reflected by the third surface, it can be converged in a first direction (the X direction illustrated in FIG. 6) and a second direction (the Y direction) at the same time, so as to perform the two-dimensional convergence to the incident light and achieve the collimation effect.

In at least some embodiments, the fourth surface 24 intersects both the top surface 23 and the bottom surface 22, and the fourth surface 24 is connected with the third surface 21. In this way, the fourth surface 24 and the third surface 21, together, form a lateral surface of the light modulation portion 2. The fourth surface 24 may have a shape as same as or different from that of the third surface 21. In the case where the fourth surface 24 and the third surface 21 have a same shape, an included angle between the fourth surface 24 and the bottom surface 22 is equal to an included angle between the third surface 21 and the bottom surface 22, and such included angle is an acute angle. In this way, each light modulation portion 22 presents a shape of circular truncated cone. Here, after cutting a circular cone by a plane parallel to a bottom surface of the circular cone, a portion between the bottom surface and the cutting surface is referred to as a circular truncated cone (also referred to as a frustum of circular cone). In the case where the fourth surface 24 and the third surface 21 have different shapes, the fourth surface may be in the form of a planar surface. For example, as illustrated in FIG. 7, the fourth surface 24 is in the form of a planar surface, and an included angle between the fourth surface 24 and the bottom surface 22 is a right angle; in such case, each light modulation portion 2 presents a shape of semi-circular truncated cone. In the present disclosure, "semi-circular truncated cone" refers to a portion obtained by cutting the circular truncated cone along a central axis of the circular truncated cone in a direction perpendicular to a top surface of the circular truncated cone. For example, in FIG. 6, each light modulation portion 2 presents a shape of semi-circular truncated cone.

Figure 4:
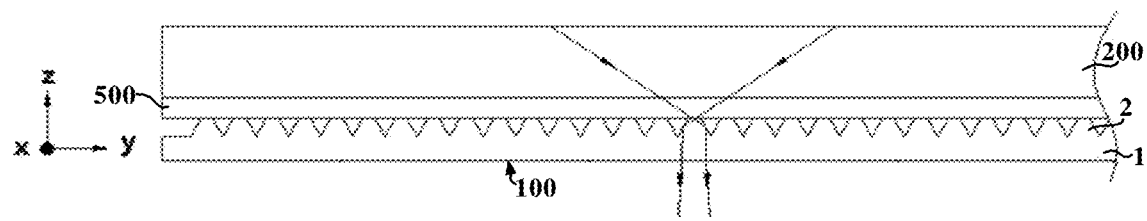
FIG. 4 is a schematic diagram (Y direction) of working principle of a backlight module in an embodiment of the present disclosure.

For example, when the light modulation portion 2 has a shape of semi-circular truncated cone, as illustrated in FIG. 7, each light modulation portion 2 has a first cross section in a plane 4, the plane 4 is perpendicular to a plane where the collimation film 1 is located and is parallel to the X direction. The first cross section has a right trapezoid shape. For another example, as illustrated in FIG. 4, each portion 2 has a second cross section in a plane which is perpendicular to the plane where the collimation film 1 is located and is parallel to the Y direction; the second cross section has an isosceles trapezoid shape. The Y direction is perpendicular to the X direction.

For example, as illustrated in FIG. 6, the plurality of light modulation portions 2 are arranged at equal intervals along the X direction, in this way, the distribution of the incident light is more uniform. Further, as illustrated in FIG. 3 and FIG. 7, in at least one example, the above-mentioned interval may be zero; that is, for any two adjacent light modulation portions 2 arranged along the X direction, the orthographic projections of the two adjacent light modulation portions 2 on the light incident surface 12 are in direct contact with each other. In this way, the light modulation portions each having a shape of semi-circular truncated cone can be arranged closely along the X direction, so as to enhance the light convergence effect of the light modulation portion. In at least one example, the light modulation portions closely arranged along the X direction can also increase an effective bonding area between a light modulating film and an optical adhesive layer, so as to improve the light exiting efficiency. In the embodiment of the present disclosure, functions of the light modulation portion include light convergence and light guidance; that is, the light modulation portion can guide light from the light guide plate or from the optical adhesive layer downwardly to exit through the light exiting surface of the collimation film.

For example, as illustrated in FIG. 4 and FIG. 7, the plurality of light modulation portions 2 are arranged at equal intervals along the Y direction. Further, as illustrated in FIG. 4, in at least one example, the above-mentioned interval may be zero; that is, orthographic projections of any adjacent two light modulation portions 2 arranged along the Y direction on the light incident surface are in direct contact with each other. In this way, the light modulation portions 2 each having a shape of semi-circular truncated cone can be arranged closely along the Y direction, so as to enhance the light convergence effect of the light modulation portion. In at least one example, the light modulation portions closely arranged along the Y direction can also increase the effective bonding area between the light modulation film and the optical adhesive layer, so as to improve the light exiting efficiency.

Among the plurality of light modulation portions 2 in the embodiment of the present disclosure, it may be possible that, for some of the light modulation portions 2, an included angle between the bottom surface 22 of the light modulation portion 2 and a tangent line of each point on the third surface 21 of the light modulation portion 2 is an acute angle; it may also be possible that, for all of the light modulation portions 2, the included angle between the bottom surface 22 of the light modulation portion 2 and the tangent line of each point on the third surface 21 of the light modulation portion 2 is an acute angle. The embodiments of the present disclosure are not limited to the above-described two situations. As illustrated in FIG. 7, in the first cross section of each light modulation portion 2, the included angle between the bottom surface 22 of the light modulation portion 2 and the tangent line of each point on the third surface 21 of the light modulation portion 2 is an acute angle, for example, the angle β illustrated in FIG. 7 is an acute angle.

In the embodiment of the present disclosure, the light modulation portion 2 and the collimation film 1 may be formed integrally, and may also be fabricated into separate parts, which is not particularly limited in embodiments of the present disclosure. When the light modulation portion 2 and the collimation film 1 are fabricated into separate parts, a refractivity index of the light modulation portion 2 is same as or close to a refractivity index of the collimation film 1, in order to avoid any influence to the light path due to different refractivity indexes between the light modulation portion 2 and the collimation film 1, and in turns affect the collimation effect. For example, the collimation film 1 and the light modulation portion 2 are formed integrally and are made from a same material, such material may be selected from the group consisting of glass, polycarbonate (PC, a high molecular polymer mainly applied in engineering plastics), polymethyl methacrylate (PMMA, also referred to as acrylic) and polyethylene terephthalate (PET). For example, when the light modulation portion 2 and the collimation film 1 are separate parts, the collimation film 1 is made of the above-described material, and a material of the light modulation portion 2 may be a curable organic material, for example, ultraviolet (UV) curing adhesive or thermal curing adhesive.

In the optical collimation assembly provided by the embodiment of the present disclosure, the light exiting from the light guide plate 200 is reflected by the third surface 21 on the light modulation portion 2, so as to perform the two-dimensional convergence to the incident light and to achieve the collimation effect. Further, because the light exits in accordance with a specific direction, the peep-proof effect can be achieved. When the optical collimation assembly is applied in a backlight module, because the optical collimation assembly of the present embodiment can reflect incident light including the large-angle light, it would not cause any loss to the brightness of the light emitted from the light source and hence improves the display effect of the display device.

In the embodiment of the present disclosure, as illustrated in FIG. 3 and FIG. 6, the light modulation portion 2 may be regarded as a revolving body structure. A semi-circular truncated cone is a geometric shape formed by rotating a right trapezoid around waist of the right trapezoid about 180°, the waist is perpendicular to a base of the right trapezoid and acts as an axial. The third surface 21 is a curved part of the light modulation portion 2, and also forms a lateral surface of the circular truncated cone. However, the shape of the light modulation portion 2 is not limited to that illustrated in the drawings. For example, in other embodiments, the light modulation portion 2 may also be a frustum of pyramid, e.g., a frustum of square pyramid, and at least one of the third surface 21 and the fourth surface 24 is the lateral surface of the light modulation portion 2. As compared to the frustum of pyramid, a revolving-curved surface of the revolving body structure is continuous without ridge or convexity therein, so it is a preferable implementation. The ridge or convexity may cause a certain influence to the reflection of light, for example, light irradiated on the ridge or convexity cannot be well converged towards the Z-direction (i.e., a direction perpendicular to a plane where the collimation film 1 is located). The revolving-curved surface is capable of reflecting lights from all directions, so that the reflected lights are converged towards the Z-direction.

In the embodiment where the light modulation portion 2 is a revolving body structure, as illustrated in FIG. 7, the right trapezoid includes an upper base, a lower base and two waists. The waist which is perpendicular to neither the upper base nor the lower base is referred to as a generatrix. In the embodiments of the present disclosure, the generatrix may be a straight line, and may also be a curved line. When the generatrix is a straight line, a complexity of the third surface 21 is reduced, so that the light modulation portion 2 can be made in an easier way, which further facilitates reducing the manufacturing cost of the light modulation portion 2.

In the embodiment where the light modulation portion 2 is a revolving body structure, the light modulation portion 2 may have a shape of circular truncated cone, that is, a geometric body formed by revolving the right trapezoid illustrated in FIG. 7 around a waist of the right trapezoid about 360°, wherein the waist is perpendicular to a base of the right trapezoid and acts as an axis. While the light modulation portion 2 has a shape of semi-circular truncated cone, it occupies less space in caparison with the case where the light modulation portion 2 has a shape of circular truncated cone; furthermore, more light modulation portions 2 can be disposed on the light incident surface of the collimation film 1 under the circumstance that the area of the light incident surface of the collimation film 1 is unchanged. In this way, when applied in a backlight module, as illustrated in FIG. 3, the light exiting from the light guide plate 200 can be reflected out by more light modulation portions 2, so as to ensure the light brightness of the backlight module. Further, as illustrated in FIG. 3, when the light modulation portion 2 reflects the light exiting from the light guide plate 200, because the light source 400 is located laterally to the light guide plate 200, only the third surface 21 serves for reflection; that is, only a surface of the light modulation portion 2 away from the light source 400 reflects the light exiting from the light guide plate 200. If the light modulation portion 2 has a shape of circular truncated cone, the other surface of the light modulation portion 2 close to the light source 400 cannot play the role of reflection. As a result, the light modulation portion 2 in the shape of semi-circular truncated cone can avoid a waste of material of the light modulation portion 2, and is a preferable implementation.

In the embodiment where the light modulation portion 2 has a shape of semi-circular truncated cone, as illustrated in FIG. 7, the third surface 21 of each light modulation portion 2 is located at a same side of a plane 3, that is, the third surface 21 of each light modulation portion 2 is located at the left side of the plane 3. For example, the plane 3 is a plane where the fourth surface of the light modulation portion 2 in a shape of semi-circular truncated cone is located. However, the arrangement manner of positions of the third surfaces 21 of the plurality of light modulation portions 2 is not limited to that illustrated in FIG. 7. For example, other embodiments may also adopt an arrangement manner as below: for some of light modulation portions 2, the third surface 21 of each light modulation portion 2 is located at a first side (e.g., left side) of the plane 3; and for the other of light modulation portions 2, the third surface 21 of each light modulation portion 2 is located at a second side (e.g., right side) of the plane 3. When the third surface 21 of each light modulation portion 2 is located at the same side of the plane 3, the mounting manner of the optical collimation assembly 100 may be adjusted during the assembling process, so as to allow the third surface 21 to be farther from the light source 400 than the fourth surface in the same light modulation portion 2. In this way, as illustrated in FIG. 3, the third surface 21 of each light modulation portion 2 can reflect the light exiting from the light guide plate 200 to be converged towards the Z-direction, so that the optical collimation assembly 100 has good collimation effect.

In the embodiment of the present disclosure, as illustrated in FIG. 6 and FIG. 7, the light modulation portion 2 may present a shape of semi-circular truncated cone. The shape of the light modulation portion 2 is not limited to that illustrated in the drawings. For example, in other embodiments, the light modulation portion 2 may also present a shape of semi-circular cone. As compared to the shape of semi-circular cone, when the light modulation portion 2 presents a shape of semi-circular truncated cone, the top of the semi-circular truncated cone has a flat surface so as to be bonded to other components in a better way. For example, as illustrated in FIG. 3, the top surface of the semi-circular truncated cone is in direct contact with the optical adhesive layer, so as to increase a contact area between the optical collimation assembly 100 and the optical adhesive layer and to facilitate improving the bonding effect between the optical collimation assembly 100 and the light guide plate 200.

Further, as illustrated in FIG. 6, in the optical collimation assembly provided by the embodiment of the present disclosure, the plurality of light modulation portions 2 are uniformly distributed on the light incident surface of the collimation film 1, in order to ensure the uniformity of light exiting from the optical collimation assembly 100. In this way, it can avoid non-uniform light exiting from the optical collimation assembly 100, so as to ensure the display effect of the display device. In the present disclosure, "uniformly distributed" refers to that the plurality of light modulation portions 2 have equal intervals.

The embodiment of the present disclosure further provides a backlight module. As illustrated in FIG. 3, the backlight module includes the optical collimation assembly 100 described in the embodiments above.

For example, the backlight module includes a light guide assembly, the light guide assembly includes a light guide plate 200, the light guide plate 200 includes a light exiting side and a rear side opposite to the light exiting side. The optical collimation assembly 100 is stacked with the light guide plate 200 and is located at the light exiting side of the light guide plate 200. The light modulation component is located between the collimation film 1 and the light guide plate 200. In this way, the plurality of light modulation portions 2 are located at a side of the collimation film 1 close to the light guide plate 200.

For example, the light modulation component is configured to reflect total reflection light that exits from the light guide plate 200 and enters the light modulation component, and to allow the total reflection light being reflected to exit from the collimation film along a direction substantially perpendicular to the light exiting surface 14.

For example, the backlight module further includes a light source 400, the light source 400 is disposed at a lateral side of the light guide plate 200 and is configured to emit incident light towards the light guide plate 200; the light guide assembly further includes a reflecting component disposed at the rear side of the light guide plate, the reflecting component is configured to reflect part of the incident light into the light modulation component in a total reflection way. For example, the reflecting component includes a plurality of prisms.

For example, when the backlight module is in working state, as illustrated in FIG. 3, the light emitted from the light source 400 enters the light guide plate 200 and is subjected to a total reflection inside the light guide plate 200. When the light is incident onto the prism 300 of the light guide plate 200, it's reflected by the prism 300 on the light guide plate 200 and exits from a light exiting surface of the light guide plate 200. The light exiting from the light exiting surface of the light guide plate 200 enters the light modulation portion 2 of the optical collimation assembly 100, and then the light that is irradiated on the third surface 21 and subjected to a reflection is converged towards the Z-direction, so as to allow the light emitted from the backlight module to exit in accordance with a specific direction.

Figure 8:
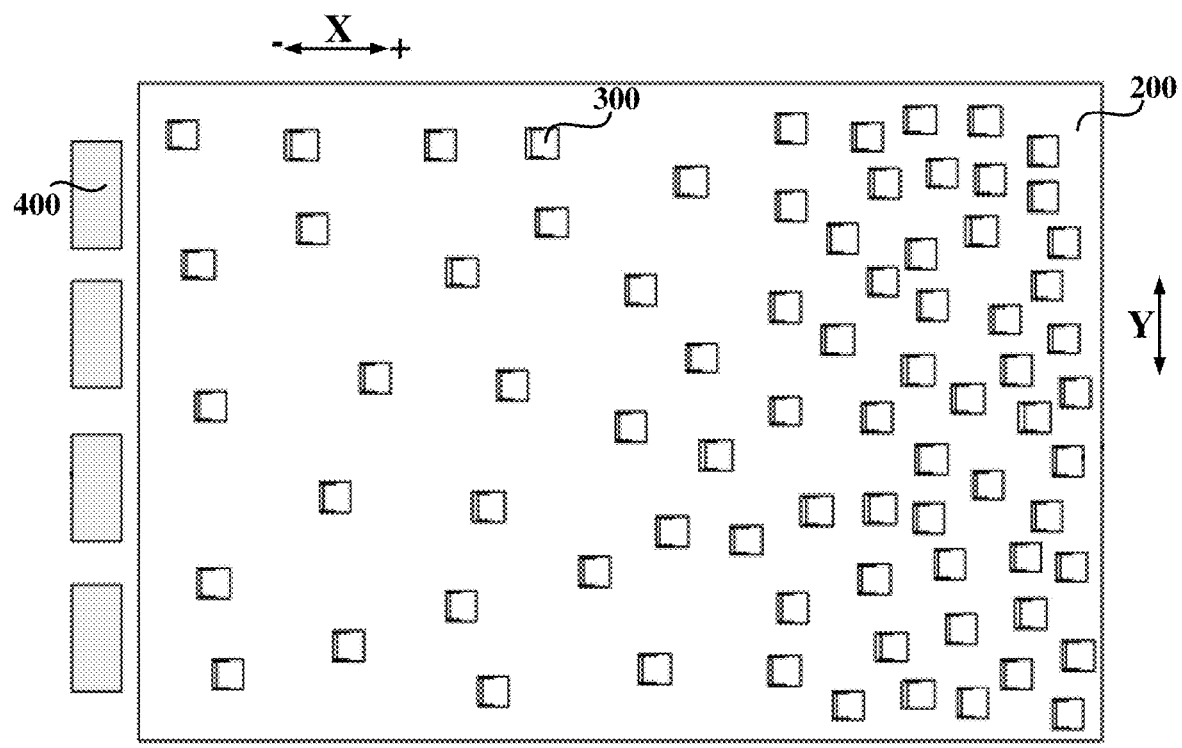
FIG. 8 is a plan view of a light guide assembly in an embodiment of the present disclosure.

For example, as illustrated in FIG. 3 and FIG. 8, in the backlight module provided by the embodiment of the present disclosure, the plurality of prisms 300 are dispersedly arranged on a surface of a side of the light guide plate 200 facing away from the optical collimation assembly 100. In this way, the incident light can be reflected as much as possible, thereby increasing the light output efficiency of the light guide assembly.

Figure 9:
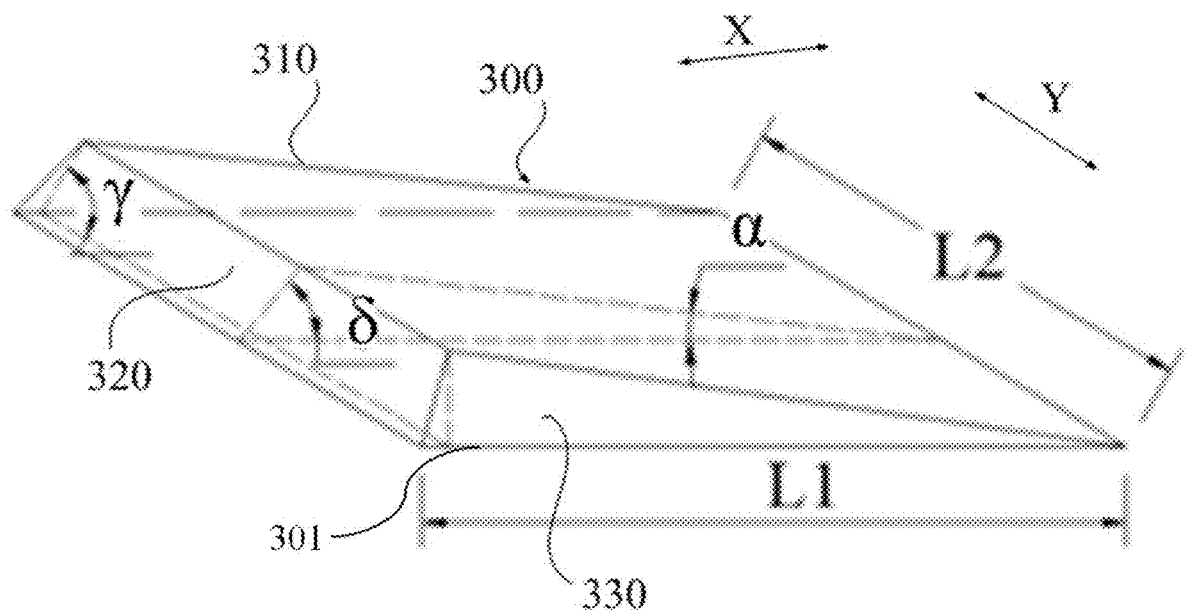
FIG. 9 is a structural diagram of a light modulation portion in an embodiment of the present disclosure.

For example, as illustrated in FIG. 9, the prism 300 includes a bottom surface 301. Further, the bottom surface 301 is parallel to a plane where the light guide plate 200 is located. The prism 300 further includes a first prism surface 310, a second prism surface 320 and two third prism surfaces 330. The first prism surface 310 and the second prism surface 320 are inclined relative to the bottom surface 301; and the first prism surface 310 and the second prism surface 320 intersect each other. Further, in at least one example, the first prism surface 310 and the second prism surface 320 are arranged along a X+ direction illustrated in FIG. 8; the two third prism surfaces 330 are arranged along the Y direction and spaced apart from each other, and each of the two third prism surfaces 330 is connected with both the first prism surface 310 and the second prism surface 320. The X+ direction is an orientated direction of the light source 400, the Y direction is a thickness direction perpendicular to the light guide plate 200 and is perpendicular to the X+ direction.

In the embodiment of the present disclosure, the first prism surface 310 of the prism 300 can destroy the total reflection of light inside the light guide plate 200, so that an incident angle of the light relative to the light exiting surface of the light guide plate 200 is decreased. For example, as illustrated in FIG. 3, the incident angle of light relative to the light exiting surface of the light guide plate 200 is reduced from θ1 to θ3, wherein θ3=θ1−2α, so that the light reflected by the first prism surface 310 exits through the light guide plate 200 and then enters the optical collimation assembly 100. In conventional spherical dots, light reflected by the spherical surface is relatively scattered, and quite a large percentage of the light leaks from the rear side of the light guide plate 200. As a result, it needs to provide a reflective sheet at the rear side of the light guide plate 200. As compared to the conventional dot (i.e., the spherical dot), the included angle between the first prism surface 310 of the prism 300 and the bottom surface of the prism 300 in the embodiment of the present disclosure is an acute angle, so that the light can be reflected to the light exiting surface of the light guide plate 200 and that the percentage of light leaking from the surface of the side of the light guide plate 200 where the prism 300 is located is small; in this way, it has no need of providing a reflective sheet at the side (i.e., the rear side) of the light guide plate 200 facing away from the light exiting surface, which not only decreases the amount of components and parts, but also reduces the thickness of the backlight module. Further, because it has no need of providing the backlight module with the reflective sheet, in at least one example, the backlight module can be well applicable in a display module provide with a front-mounted backlight source.

In the embodiment of the present disclosure, the prism 300 and the light guide plate 200 may be formed integrally, and may be fabricated into separate parts, the embodiments of the present disclosure is not limited thereto. When the prism 300 and the light guide plate 200 are fabricated into separate parts, a refractivity index of the prism 300 should be equal to or close to a refractivity index of the light guide plate 200, in order to avoid any influence to the light path caused by different refractivity indexes thereof. As illustrated in FIG. 9, in a plane perpendicular to the Y direction, a cross-sectional shape of the prism 300 may be a triangle (for example, as illustrated in FIG. 12(b)), and a base of the triangle is formed by the bottom surface 301 (as illustrated in FIG. 3) of the prism 300. The cross-sectional shape of the prism may also be a trapezoid, and a lower base of the trapezoid is formed by the bottom surface of the prism.

In order to allow the light exiting from the light guide plate 200 to be more uniform, as illustrated in FIG. 8, the plurality of prisms 300 are arranged on the surface of the light guide plate 200 at a density which is gradually increased along the X+ direction. At a position close to the light source 400, the illumination intensity is greater, and the arrangement density of the plurality of prisms 300 is smaller, in order to avoid an excessively larger light exiting amount of light being reflected at this position; at a position away from the light source 400, the illumination intensity is smaller, and the arrangement density of the plurality of prisms 300 is greater, in order to avoid an excessively smaller light exiting amount of light being reflected at this position. With the above-mentioned arrangement, the light exiting from the light guide plate 200 can be uniformly distributed, so as to ensure that the brightness of light exiting from the light guide plate 200 is uniform.

Figure 11:
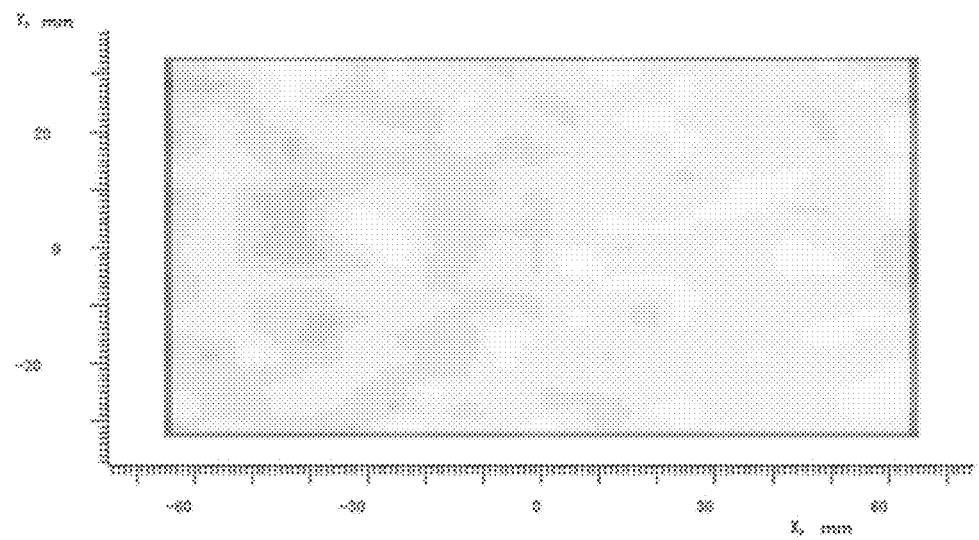
FIG. 11 is a raster image illustrating an illumination uniformity of a backlight module in an embodiment of the present disclosure.

FIG. 11 is a raster image illustrating an illumination uniformity of a backlight module in an embodiment of the present disclosure. As illustrated in FIG. 11, it can be derived from analog simulation that, when the plurality of prisms 300 are arranged in the above-described manner, the illumination uniformity of the collimation optical system can reach 88% so as to improve an image uniformity of the display device.

In the embodiment of the present disclosure, as illustrated in FIG. 3 and FIG. 12(b), an included angle α between the first prism surface 310 and the bottom surface 301 (as illustrated in FIG. 9, the bottom surface of the prism 300 is a surface where the prism 300 is in contact with the light guide plate 200) of the prism 300 is an important parameter. For example, the included angle α between the first prism surface 310 and the bottom surface of the prism 300 is an acute angle. It's inappropriate for α to be excessively greater or smaller. If α is excessively greater, a reduction on the incident angle of light relative to the light exiting surface of the light guide plate 200 will be excessively large after the light is reflected by the first prism surface 310, as a result, the accuracy of the prism 300 to deflect the light is lowered. If α is excessively smaller, a reduction on the incident angle of light relative to the light exiting surface of the light guide plate 200 will be excessively small after the light is reflected by the first prism surface 310, as a result, the light needs be subjected to a total reflection for multiple times inside the light guide plate 200 and be reflected for multiple times by the first prism surface 310 in order to exit the light guide plate 200, which is not beneficial for the promotion of the light modulation efficiency of the prism 300. It has been found by study that, when 1°<α<10°, both the accuracy of light deflection and the light modulation efficiency of the prism 300 can be ensured, which is a preferable implementation, consequently.

For example, as illustrated in FIG. 9 and FIG. 12(b), an included angle δ between the second prism surface 320 of the prism 300 and the bottom surface 301 of the prism 300 is also an important parameter. It's inappropriate for δ to be excessively greater or smaller. If δ is excessively greater (e.g., 90°), a processing difficulty of the prism 300 is increased. If δ is excessively smaller, when a height of the prism 300 is given, a size of the prism 300 in the X direction is increased, which makes it easy to observe a shadow of the prism 300 in a displayed image. It has been found by study that, when 30°<δ<90°, the processing of the prism 300 is facilitated and also the shadow of the prism 300 is not easy to be observed in the displayed image, which is advantageous for improving the display effect and hence is a preferable implementation.

Figure 12A:
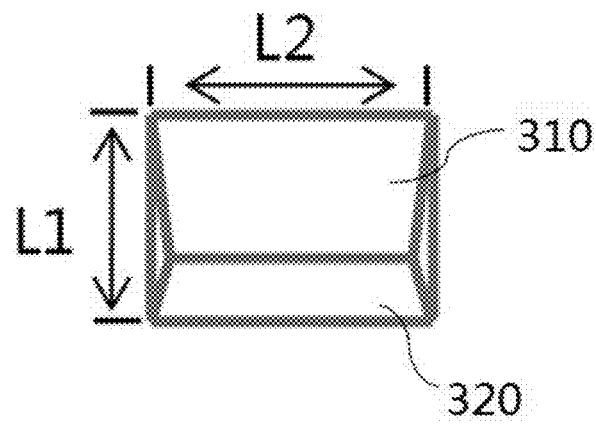
FIG. 12($a$) is a plan view of a light modulation portion in an embodiment of the present disclosure.
Figure 12B:
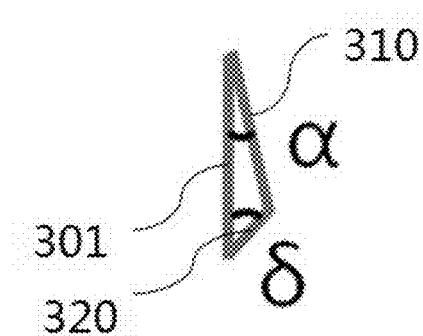
Figure 12C:
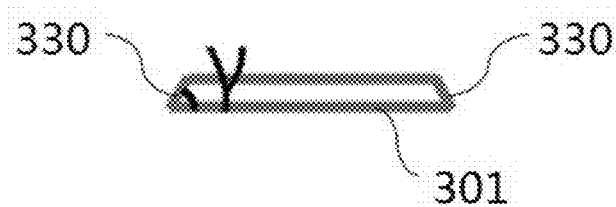

For example, as illustrated in FIG. 9 and FIG. 12(c), an included angle γ between the third prism surface 330 of the prism 300 and the bottom surface 301 of the prism 300 is also an important parameter. It's inappropriate for γ to be excessively greater or smaller. If γ is excessively greater (e.g., 90°), the processing difficulty of the prism 300 is also increased. If γ is excessively smaller, when the height of the prism 300 is given, a size of the prism 300 in the Y direction is increased, which makes it easy to observe the shadow of the prism 300 in the displayed image. It has been found by study that, when 25°<γ<90°, the processing of the prism 300 is facilitated and also the shadow of the prism 300 is not easy to be observed in the displayed image, which is advantageous for improving the display effect and hence is a preferable implementation.

In order to allow the user to less likely to observe the shadow of the prism 300 in the displayed image, as illustrated in FIG. 9 and FIG. 12(a), both L1 and L2 are smaller than 100 μm. L1 is the size of the prism 300 in the X direction, and L2 is the size of the prism 300 in the Y direction. In this way, the size of the prism 300 in both the X direction and the Y direction is not excessively greater, so that the user is less likely to observe the shadow of the prism 300 in the displayed image, which facilitates improving the display effect.

In order to fixedly connect the optical collimation assembly 100 with the light guide plate 200, for example, as illustrated in FIG. 3, the backlight module further includes an optical adhesive layer 500, the light guide plate 200 is bonded with the optical collimation assembly 100 through the optical adhesive layer 500, so as to ensure that the optical collimation assembly 100 is fixedly connected with the light guide plate 200, and to prevent from dislocation between the light guide plate 200 and the optical collimation assembly 100.

For example, the above-mentioned optical adhesive layer 500 is an adhesive material with low refractivity index, for example, UV photosensitive adhesive with low refractivity index. For example, the refractivity index n2 of the optical adhesive satisfies n2<1.45, the optical adhesive layer 500 is closely attached to the light guide plate 200 so as to form a flat bonding surface.

For example, the refractivity index n1 of the light guide plate 200 and the refractivity index n3 of the light modulation portion 2 both are greater than the refractivity index n2 of the optical adhesive layer. The refractivity index n1 of the light guide plate 200 is greater than the refractivity index n2 of the optical adhesive layer, so as to ensure that the light emitted from the light source 400 enters the optical adhesive layer 500 under a reflection effect of the prism 300 on the light guide plate 200, and in turns ensure that the light can be subjected to a total reflection inside the light guide plate 200, which facilitates a diffusion of light inside the light guide plate 200 (when light enters an optically thinner medium from an optically denser medium, the incident angle needs to be smaller than a total reflection angle so that the light can enter the optically thinner medium; otherwise, a total reflection may be occurred) and avoids the case that the light emitted from the light source 400 directly enters the optical adhesive layer 500 without a total reflection inside the light guide plate 200. The refractivity index n3 of the light modulation portion 2 is greater than the refractivity index n2 of the optical adhesive layer, so as to ensure that the light passing through the optical adhesive layer 500 can directly enter the light modulation portion 2 (light can directly enter the optically denser medium from the optically thinner medium) and to avoid the case that the total reflection of light occurring on the light modulation portion 2 influences the convergence of light towards the Z-direction.

For example, as illustrated in FIG. 3, the plane 3 is perpendicular to the orientated direction of the light source 400, and the third surface 21 of each light modulation portion 2 is located at a side of the plane 3 facing away from the light source 400. In this way, the third surface 21 of each light modulation portion 2 can reflect the light exiting from the light guide plate 200 and allow the light to be converged towards the Z-direction, so that the optical collimation assembly 100 has good collimation effect.

Hereinafter, the working principle of the backlight module provided by the embodiment of the present disclosure will be particularly described.

As illustrated in FIG. 3, light emitted from the light source 400 enters the light guide plate 200, and is subjected to a total reflection inside the light guide plate 200 after entering the light guide plate 200. When the light is irradiated on the prism 300 and reflected by the first prism surface 310, an included angle between the light and the Z-direction will be reduced from θ1 to θ3, wherein θ3 satisfies θ3=θ1θ2α.

When the included angle θ3 between the light and the Z-direction satisfies: θ3<θ$_0$ (θ$_0$ is the total reflection angle of the light guide plate 200), the light will enter the optical adhesive layer 500 and then enter the light modulation portion 2. Upon being reflected by the third surface 21 of the light modulation portion 2, the reflected light exit the collimation film 1 along a direction substantially perpendicular to the Z-direction, so as to achieve the collimation effect. When the included angle satisfies: θ3>θ$_0$, the light is subjected to a total reflection inside the light guide plate 200, and then the incident angle of light is reduced by the prism 300, that is, reduced by 2α every time, and finally the included angle is reduced to satisfy: θ3<θ$_0$. Light enters the optical adhesive layer 500 from the light guide plate 200, and then enters the light modulation portion 2 from the optical adhesive layer 500; the light modulation portion 2 reflects the incoming light, and the reflected light exits the collimation film 1 along a direction substantially parallel to the Z-direction, so as to achieve the collimation effect.

As illustrated in FIG. 3, in the optical collimation assembly 100, an air layer is in a gap between two adjacent light modulation portions 2. In the situation where light exiting the optical adhesive layer 500 is incident onto the air layer between the two adjacent light modulation portions 2, the light is totally reflected and returns into the light guide plate 200; the light returning into the light guide plate 200 is reflected again and then enters the optical adhesive layer 500, until the light can enter the light modulation portion 2.

In the optical collimation assembly 100 provided by the embodiment of the present disclosure, an inclined angle β of the third surface 21 of the light modulation portion 2 with respect to the bottom surface 22 of the light modulation portion 2 is an important parameter which is in direct correlation with the collimation effect of light. Hereinafter, a computational process of the inclined angle β will be particularly described.

Figure 5:
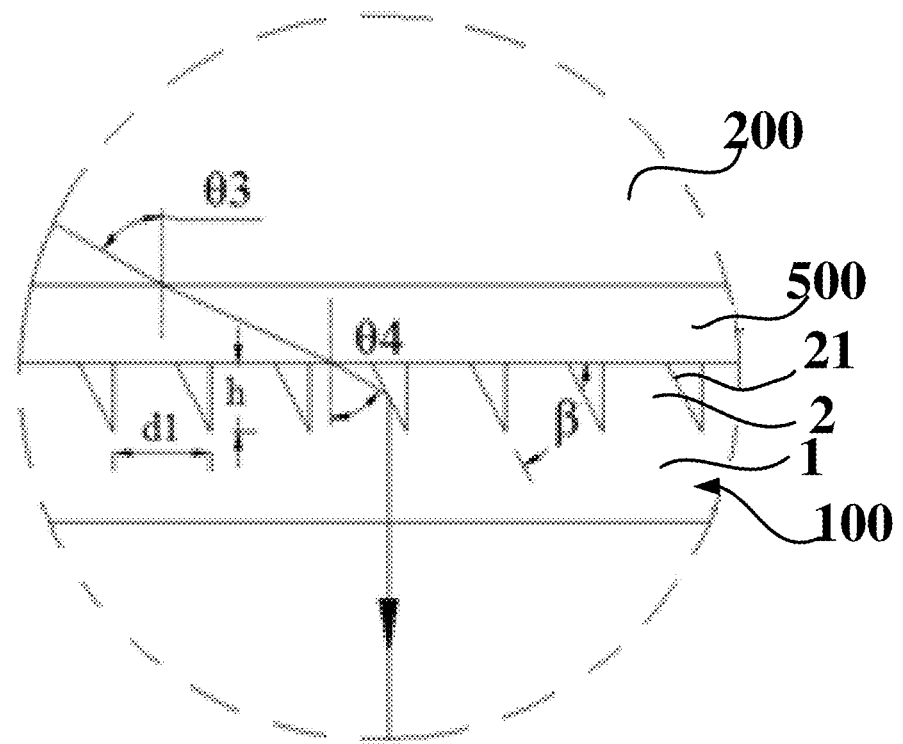
FIG. 5 is a partially enlarged view of FIG. 3.

As illustrated in FIG. 3 and FIG. 5, it can be derived from a geometrical relationship that:

$$\theta=(\pi-\theta 4)/2; \quad (1)$$

According to an included angle between the light and the Z-direction during a process in which the light enters the optical adhesive layer 500 from the light guide plate 200 and then enters the light modulation portion 2 from the optical adhesive layer 500, it can be derived that:

$$\theta 4=\arcsin[(n1/n3)\sin \theta 3]; \quad (2)$$

In the X direction, an incident angle θ3 that is allowed to exit the light guide plate 200 has a fluctuation range as below:

$$\arcsin(n2/n1)-2\alpha \leq \theta 3 \leq \arcsin(n2/n1); \quad (3)$$

Given that the included angle θ3 takes a value within the fluctuation range for subsequent calculation, that is:

$$\theta 3=\arcsin(n2/n1)-\alpha; \quad (4)$$

Based on the formulas (1), (2) and (4), it can be derived that:

$$\beta=90°-(\tfrac{1}{2})\arcsin\{(n1/n3)\sin[\arcsin(n2/n1)-\alpha]\}; \quad (5)$$

By substituting the values of n1, n2, n3 and a into the formula (5), the value of β can be obtained.

In the optical collimation assembly 100 provided by the embodiment of the present disclosure, the size d1 of the light modulation portion 2 in the X direction and the height h of the light modulation portion 2 are also important parameters of the light modulation portion 2. A ratio of d1 to h determines a contact area between the optical collimation assembly 100 and the optical adhesive layer 500. The larger the ratio of d1 to h is, the greater the area of the top surface of the light modulation portion 2 is, and the greater the contact area between the light modulation portion 2 and the optical adhesive layer 500 is. In this way, most of light exiting from the light guide plate 200 can enter the optical collimation assembly 100 without the need of reflection by the air layer, which increases the light-emitting efficiency of the optical collimation assembly 100. On the contrary, the smaller the ratio of d1 to h is, the lower the light-emitting efficiency of the optical collimation assembly 100 is.

As illustrated in FIG. 5, it can be derived from the geometrical relationship that:

$$d1/h \leq (\tan \theta 4)\min; \quad (6)$$

By substituting "θ4=arcsin[(n1/n3)sin θ3] =arcsin{(n1/n3)sin[arcsin(n2/n1)−2α]}" into the formula (6), it can be derived that:

$$d1/h \leq \tan\{\arcsin\{(n1/n3)\sin[\arcsin(n2/n1)-2\alpha]\}\}; \quad (7)$$

By substituting values of n1, n2, n3 and a into formula (7), the maximum value of d1/h can be obtained. Based on d1/h and on the value of d1 (smaller than 50 μm, as far as possible), the value of h can be obtained.

Figure 10:
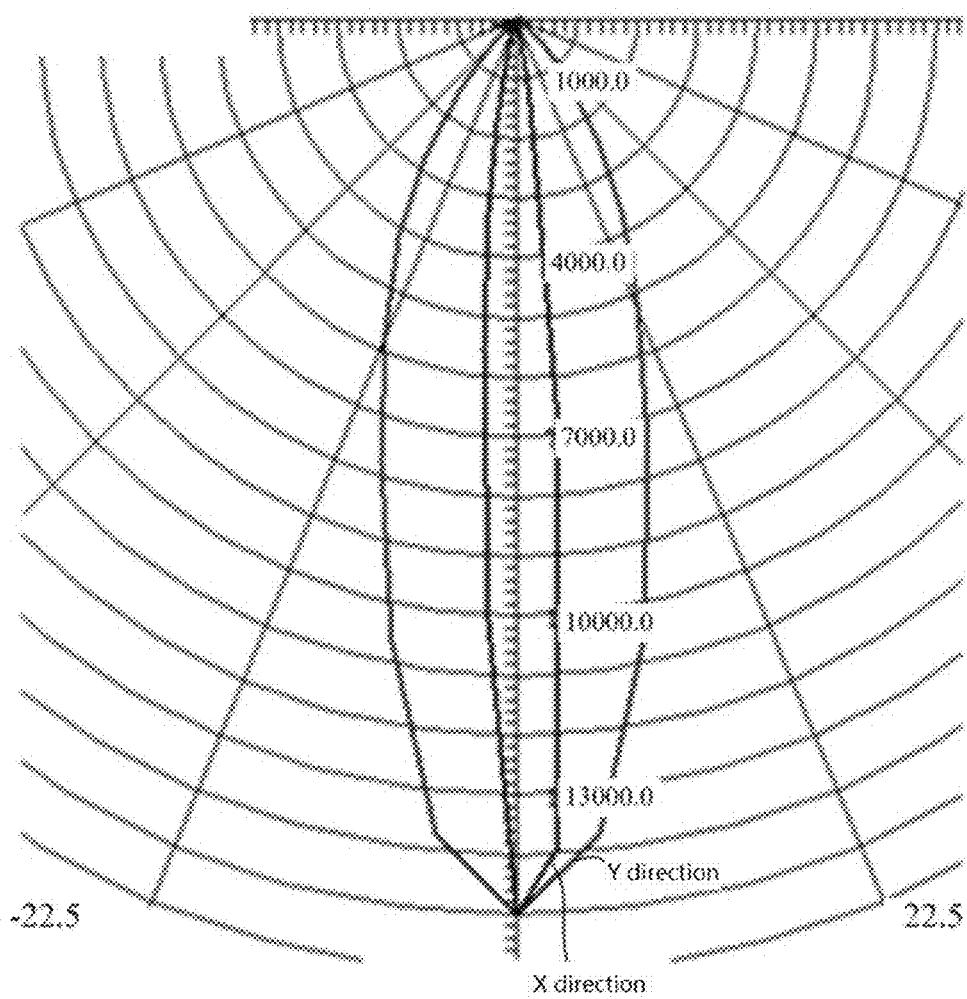
FIG. 10 is a graph illustrating an angular brightness of a backlight module in an embodiment of the present disclosure.

Establishing a simulation model for the backlight module provided by the embodiment of the present disclosure, and performing a simulated analysis to obtain simulated results as below: as illustrated in FIG. 10, in the X direction, light exiting from the backlight module has a half-brightness angle of ±5°, and a cutoff angle of ±10°; in the Y direction, the light exiting from the backlight module has a half-brightness angle of ±18°, and a cutoff angle of ±45°. As it can be seen from the results illustrated in FIG. 10, the collimation effect of light in the X direction is better than that in the Y direction, this is because that the light source 400 is arranged along the Y direction, and more scattered lights exist in the Y direction, as illustrated in FIG. 4 and FIG. 8. However, on the whole, the backlight module provided by the embodiment of the present disclosure still possesses good collimation effect.

It should be explained that, the half-brightness angle refers to an angle (an included angle between the light and Z direction) corresponding to the case where a brightness of the light is attenuated to one half (50%) of a central brightness; and the cutoff angle is an angle corresponding to the case where the brightness of the light is attenuated to 0.5% of the central brightness.

Figure 2:
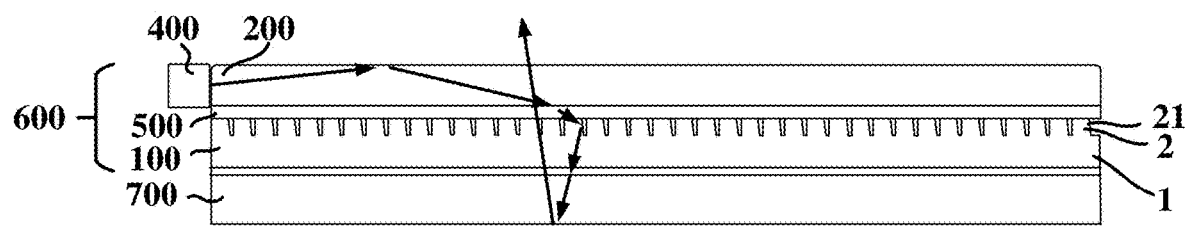
FIG. 2 is a structural diagram of a display device in an embodiment of the present disclosure.

The embodiment of the present disclosure further provides a display device. As illustrated in FIG. 2, the display device includes a backlight module 600, the backlight module 600 for example is the backlight module described in the embodiments above.

For example, the display device may be provided with a front-mounted backlight source structure (as illustrated in FIG. 2), and can also be provided with a rear-mounted backlight source structure, the embodiments of the present disclosure are not limited thereto. In the display device with front-mounted backlight source structure, the rear side of the light guide plate 200 is not provided with a reflective sheet, and the backlight module 600 is disposed at a front side of a display panel 700. As illustrated in FIG. 2, the optical collimation assembly 100 is bonded to the display panel 700 through an optical adhesive layer, light of the backlight module 600 will enter the display panel 700 from top to bottom and finally be reflected by a reflective layer at the bottom of the display panel 700 to exit the light guide plate 200, so as to achieve a front-mounted backlight function. For example, the display panel 700 may be a reflective liquid crystal display (R-LCD) panel.

In the display device, as illustrated in FIG. 2 and FIG. 3, the optical collimation assembly 100 is disposed at a light exiting side of the light guide plate 200, and a plurality of light modulation portions 2 is located at a surface of a side of the collimation film 1 close to the light guide plate 200. During the display device is in a working state, as illustrated in FIG. 3, light emitted from the light source 400 (e.g., LED) enters the light guide plate 200 and is subjected to a total reflection inside the light guide plate 200. When the light is incident on the prism 300 on the light guide plate 200, it's reflected by the prism 300 on the light guide plate 200 and then exits the light exiting surface of the light guide plate 200. The light exiting the light exiting surface of the light guide plate 200 enters the light modulation portion 2 of the optical collimation assembly 100. Because the included angle between the bottom surface 22 of the light modulation portion 2 and the tangent line of each point on the third surface 21 of the light modulation portion 2 is an acute angle, the light entering the light modulation portion 2 is incident onto the third surface 21 and reflected by the third surface 21, then the reflected light is converged towards the Z direction (i.e., to constraint the included angle between light and Z direction to a certain range), in this way, the light emitted from the backlight module can exit in accordance with a specific angle. For example, the display device may be a device with displaying function such as a mobile phone, a notebook computer and a tablet computer.

In the present disclosure, the following statements should be noted:

(1) The accompanying drawings related to the embodiment(s) of the present disclosure involve only the structure (s) in connection with the embodiment(s) of the present disclosure, and other structure(s) can be referred to common design(s).

(2) For purpose of clarity, in the drawings describing the embodiment(s) of the present disclosure, thickness(es) of layer(s) or region(s) may be enlarged or contracted, that is, the drawings are not drafted according to actual scales.

(3) In case of no conflict, the embodiments of the present disclosure and the features in the embodiments can be combined with each other to obtain new embodiments.

What have been described above are only exemplary implementations of the present disclosure, the protection scope of the present disclosure is not limited thereto. The protection scope of the present disclosure should be determined based on the appended claims.

What is claimed is:

1. An optical collimation assembly, comprising:
a collimation film, the collimation film comprising a light incident surface and a light exiting surface; and
a light modulation component, the light modulation component being located on the light incident surface of the collimation film and consisting essentially of a plurality of light modulation portions arranged in an array, each of the plurality of light modulation portions comprising:
a first surface close to the light incident surface;
a second surface configured to be opposite to the first surface and be away from the light incident surface; and
a third surface intersecting both the first surface and the second surface, an included angle between the third surface and the first surface being an acute angle,
wherein the third surface is configured to reflect light entering the light modulation portions from the second surface, such that the light being reflected exits from the collimation film along a direction substantially perpendicular to the light exiting surface,
wherein a dimension of each of the plurality of light modulation portions in a direction parallel to a plane where the collimation film is located is gradually increased along a direction pointing from the light incident surface to the light exiting surface.

2. The optical collimation assembly according to claim 1, wherein the third surface comprises a conical surface.

3. The optical collimation assembly according to claim 2, further comprising: a fourth surface, wherein the fourth surface intersects both the first surface and the second surface, the fourth surface and the conical surface are connected with each other, and the fourth surface is a planar surface.

4. The optical collimation assembly according to claim 3, wherein an included angle between the fourth surface and the first surface is a right angle, and each of the plurality of light modulation portions has a shape of a semi-circular truncated cone.

5. The optical collimation assembly according to claim 4, wherein:

the plurality of light modulation portions are arranged at equal intervals along a first direction, the first direction is parallel to the plane where the collimation film is located,
each of the plurality of light modulation portions has a first cross section in a plane which is perpendicular to the plane where the collimation film is located and parallel to the first direction, and
the first cross section is in a shape of a right trapezoid.

6. The optical collimation assembly according to claim 5, wherein an included angle between the first surface and a tangent line of each point on the third surface is an acute angle in the first cross section.

7. The optical collimation assembly according to claim 6, wherein orthographic projections of any two adjacent light modulation portions arranged along the first direction on the light incident surface are in direct contact with each other.

8. The optical collimation assembly according to claim 5, wherein:

the plurality of light modulation portions are arranged at equal intervals along a second direction, the second direction is parallel to the plane where the collimation film is located,
each of the plurality of light modulation portions has a second cross section in a plane which is perpendicular to the plane where the collimation film is located and parallel to the second direction,
the second cross section is in a shape of an isosceles trapezoid, and the second direction is perpendicular to the first direction.

9. The optical collimation assembly according to claim 8, wherein orthographic projections of any two adjacent light modulation portions arranged along the second direction on the light incident surface are in direct contact with each other.

10. The optical collimation assembly according to claim 9, wherein:

the collimation film and the light modulation portions are fabricated into separate parts,
the collimation film comprises an organic insulating material, and
the light modulation portions comprise a curable organic insulating material.

11. A backlight module, comprising:
a light guide assembly, the light guide assembly comprising a light guide plate, the light guide plate comprising a light exiting side and a rear side opposite to the light exiting side; and
an optical collimation assembly, the optical collimation assembly being stacked with the light guide plate and located at the light exiting side of the light guide plate, wherein the optical collimation assembly comprises:
a collimation film, the collimation film comprising a light incident surface and a light exiting surface; and
a light modulation component, the light modulation component being located on the light incident surface of the collimation film and consisting essentially of a plurality of light modulation portions arranged in an array, each of the plurality of light modulation portions comprising:
a first surface close to the light incident surface;
a second surface configured to be opposite to the first surface and be away from the light incident surface; and a third surface intersecting both the first surface and the second surface, an included angle between the third surface and the first surface being an acute angle, wherein the third surface is configured to reflect light entering the light modulation portion from the second surface, such that the light being reflected exits from the collimation film along a direction substantially perpendicular to the light exiting surface, wherein the light modulation component is located between the collimation film and the light guide plate, wherein a dimension of each of the plurality of light modulation portions in a direction parallel to a plane where the collimation film is located is gradually increased along a direction pointing from the light incident surface to the light exiting surface.

12. The backlight module according to claim 11, wherein the light modulation component is configured to reflect total reflection light that exits from the light guide plate and enters the light modulation component, and to allow the total reflection light to exit from the collimation film along a direction substantially perpendicular to the light exiting surface.

13. The backlight module according to 12, further comprising: a light source, wherein the light source is disposed at a lateral side of the light guide plate and is configured to emit incident light towards the light guide plate, the light guide assembly further comprising a reflecting component, wherein the reflecting component is disposed at the rear side of the light guide plate and configured to reflect part of the incident light into the light modulation component in a total reflection manner.

14. The backlight module according to claim 13, wherein the reflecting component comprises a plurality of prisms, the plurality of prisms are arranged at a density which is gradually increased along a direction facing away from the light source.

15. The backlight module according to claim 14, wherein each of the plurality of prisms comprises:

a bottom surface parallel to a plane where the light guide plate is located; and a first prism surface, a second prism surface and two third prism surfaces, wherein the first prism surface and the second prism surface are inclined with respect to the bottom surface, the first prism surface and the second prism surface intersect each other, the two third prism surfaces are opposite to each other, each of the two third prism surfaces intersects all of the first prism surface, the second prism surface, and the bottom surface.

16. The backlight module according to claim 15, wherein:

an included angle between the first prism surface and the bottom surface is $\alpha$, and $1°<\alpha<10°$, and an included angle between the second prism surface and the bottom surface is $\delta$, and $30°<\delta<90°$.

17. The backlight module according to claim 16, wherein the two third prism surfaces have a same included angle $\gamma$ with respective to the bottom surface, and $25°<\gamma<90°$.

18. The backlight module according to claim 11, further comprising an optical adhesive layer, wherein the light guide plate is bonded to the light modulation component through the optical adhesive layer, and a refractive index of the light guide plate and a refractive index of the light modulation component both are greater than a refractive index of the optical adhesive layer.

19. A display device, comprising:

a backlight module, the backlight module comprising:

a light guide assembly, the light guide assembly comprising a light guide plate, the light guide plate comprising a light exiting side and a rear side opposite to the light exiting side; and an optical collimation assembly, the optical collimation assembly being stacked with the light guide plate and located at the light exiting side of the light guide plate, wherein the optical collimation assembly comprises:

a collimation film, the collimation film comprising a light incident surface and a light exiting surface; and a light modulation component, the light modulation component being located on the light incident surface of the collimation film and consisting essentially of a plurality of light modulation portions arranged in an array, each of the plurality of light modulation portions comprising:

a first surface close to the light incident surface;

a second surface configured to be opposite to the first surface and be away from the light incident surface; and a third surface intersecting both the first surface and the second surface, an included angle between the third surface and the first surface being an acute angle, wherein the third surface is configured to reflect light entering the light modulation portion from the second surface, such that the light being reflected exits from the collimation film along a direction substantially perpendicular to the light exiting surface, wherein the light modulation component is located between the collimation film and the light guide plate, wherein a dimension of each of the plurality of light modulation portions in a direction parallel to a plane where the collimation film is located is gradually increased along a direction pointing from the lit incident surface to the light exiting surface.

20. The display device according to claim 19, further comprising:

a display panel, located at a side of the optical collimation assembly away from the light guide plate, wherein light emitted from a light source passes through the light guide plate and the optical collimation assembly, and then enters the display panel.

* * * * *